United States Patent [19]

Flannery

[11] Patent Number: 5,012,559
[45] Date of Patent: May 7, 1991

[54] ROPE TIGHTENER

[76] Inventor: Matt W. Flannery, 310 Berry Ave., Ashland, Ky. 41101

[21] Appl. No.: 451,136

[22] Filed: Dec. 15, 1989

[51] Int. Cl.⁵ ............................................. A44B 21/00
[52] U.S. Cl. ................................... 24/71.3; 24/129 C
[58] Field of Search ................... 24/71.3, 71.2, 129 A, 24/129 B, 129 C, 131 R, 135 L, 547–554

[56] References Cited

U.S. PATENT DOCUMENTS

| | | | |
|---|---|---|---|
| 830,978 | 9/1906 | Dunn | 24/71.3 |
| 1,469,112 | 9/1923 | Schoonover | 24/71.3 |
| 1,475,245 | 11/1923 | Rothermel | 24/71.3 |
| 1,724,791 | 8/1929 | Cain | 24/129 C |
| 1,725,130 | 8/1929 | Ciferskor | 24/71.3 |
| 1,789,891 | 1/1931 | Alke | 24/71.3 |
| 1,792,468 | 2/1931 | Sheckels et al. | 24/71.3 |
| 3,125,907 | 3/1964 | Derrickson | 24/71.3 |
| 3,568,261 | 3/1971 | Korb | 24/71.3 |
| 3,879,805 | 4/1975 | Gretter | 24/71.3 |
| 4,254,537 | 3/1981 | Malacheski et al. | 24/71.3 |

FOREIGN PATENT DOCUMENTS

| | | | |
|---|---|---|---|
| 372570 | 4/1907 | France | 24/71.3 |
| 507909 | 9/1920 | France | 24/71.3 |
| 1482090 | 4/1967 | France | 24/71.3 |

Primary Examiner—Victor N. Sakran

[57] ABSTRACT

This rope tightener is supported by or is engageable with a rope, line cord, or the like before it is manually tensioned and thereafter manipulated to draw the rope taut. The rope is stressed by threading the rope through a rectangular shaped loop in the device and then rotating the device in a plane parallel to the rope to twist the rope around a central body portion of the rectangular shaped loop in the device. After the first rotation of the device, the rope begins to wrap around itself. This lengthens the path of the rope and applies tension to the rope. The device is secured against reverse rotation by placing a reach of the rope under a reverse hook on the other end of the device. The device is a simple, one piece, rigid element, which is capable of giving a huge mechanical advantage in applying tension to a rope, line, cord or the like.

2 Claims, 3 Drawing Sheets

ROPE TIGHTENER

CROSS REFERENCES TO RELATED APPLICATIONS

Reference may be had to U.S. Pat. Nos. 1,191,598 and 1,261,505 and 1,855,049 and 1,951,898 and 3,711,901 to show the state of the art of rope tighteners over which this device is believed to be patentable.

SUMMARY OF THE INVENTION

This invention pertains to a rope tightener which is a one piece metal wire shape. One end of this device has a rectangular shaped loop through which the rope is threaded. The central body portion is straight and extends outwardly at an angle to the rectangular shaped loop, and of a length to give the desired mechanical advantage in applying tension to the rope. The other end of this device has a hook, which is perpendicular to the plane of the device and is shaped to prevent reverse rotation of device, when the rope is secured at the desired tension.

After the ends of the rope have been secured and the rope drawn hand-tight, and with the rope threaded through the rectangular shaped loop on one end of device, the device is rotated in a plane parallel to the rope. This rotation twists the rope around a central body portion of the rectangular shaped loop in the end of device. After the first rotation of the device, the rope begins to wrap around itself. This lengthens the path of the rope, which removes slack and increases tension. This device is then secured against reverse rotation by placing a reach of the rope under the hook on the other end of the device.

After a tie-down, tent line, guy line, clothes line or the like has had a light tension applied thereto manually, this device is of particular use in drawing the rope or line taut to have it operate more effectively for the purpose for which it is employed.

DESCRIPTION OF THE DRAWING VIEWS

Figure 1:
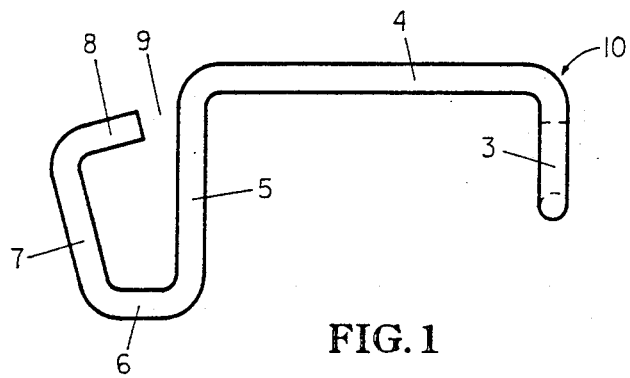
FIG. 1 is a side view of the rope tightening device embodying features of the present invention.
Figure 2:
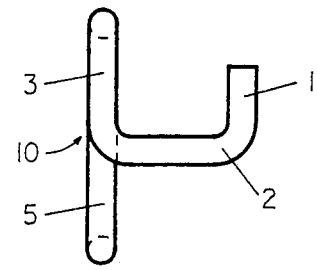
FIG. 2 is a right end view of the structure illustrated in FIG. 1.
Figure 4:
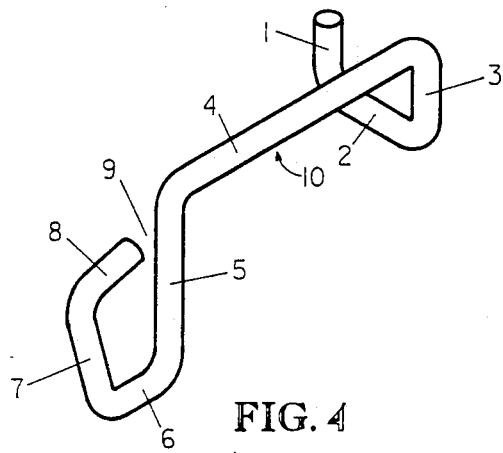
Figure 3:
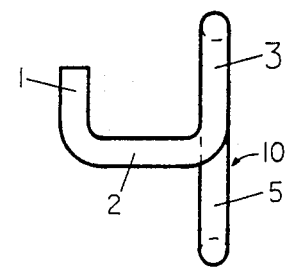
FIG. 3 is another right end view of the structure illustrated in FIG. 1 with the hook on the end shown opposite hand from FIG. 2.
Figure 5:
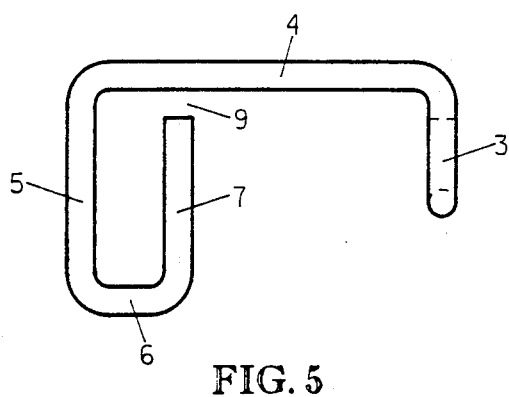
Figure 6:
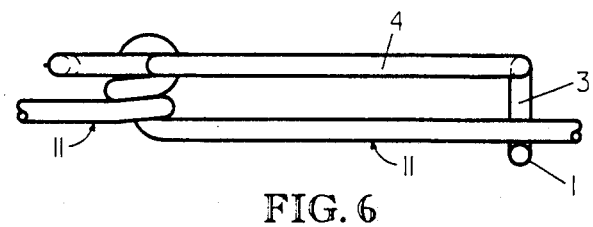
Figure 7:
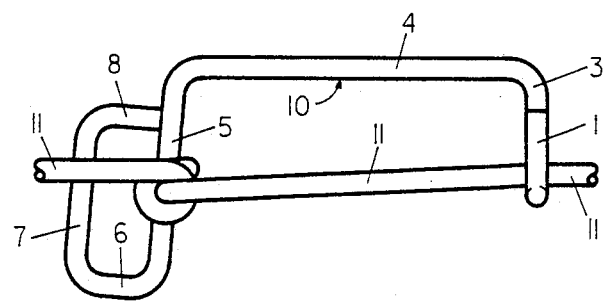

FIG. 4 a perspective view of structure illustrated in FIG. 1;

FIG. 5 is another side view of the present invention showing the rectangular shaped loop on one end of the device formed at a 180 degree rotation from that shown in FIG. 1;

FIG. 6 is a top view of the present invention showing the use of the device in tightening a rope, line, cord, or the like; and FIG. 7 is a side view of the rope tightening application shown in FIG. 6.

Figures 8, 10:
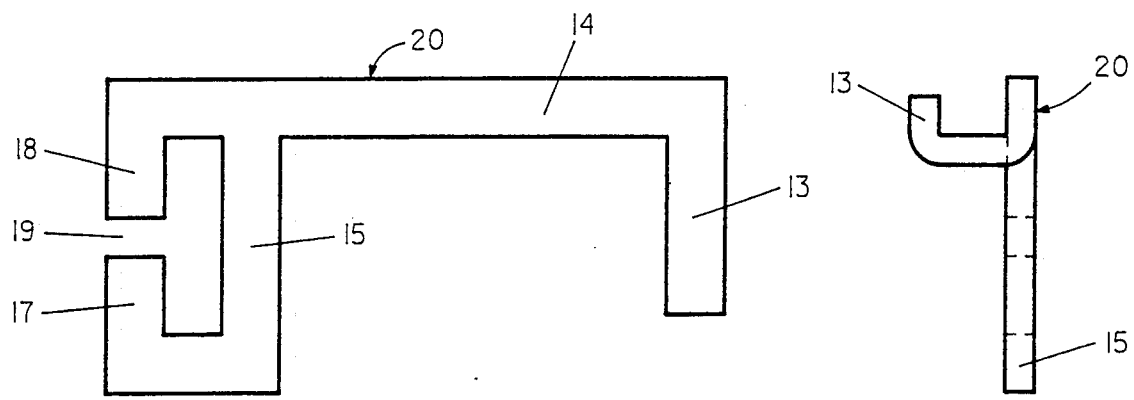

FIG. 8 is another form of the present invention, which shows a side view of a shape which could be stamped from a flat metal plate.

Figure 9:
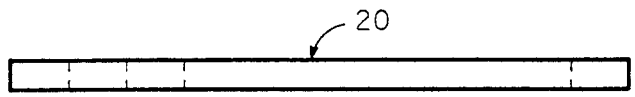

FIG. 9 is a top view of the shape shown in FIG. 8.

FIG. 10 is an end view of the shape shown in FIG. 8, except the right end extension 13 is shown bent to form a hook.

Figure 11:
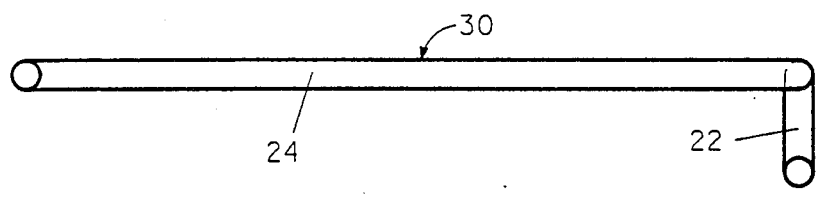

FIG. 11 is yet another form of the present invention, which shows the top view of a steel wire shape which embodies features of the present invention.

Figure 12:
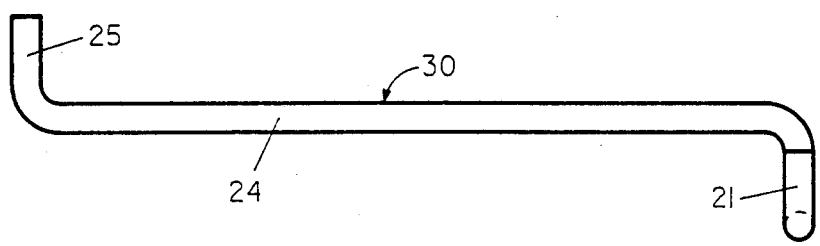

FIG. 12 is a side view of the structure illustrated in FIG. 11.

Figure 13:
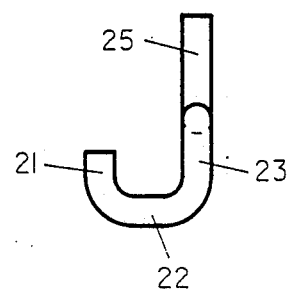

FIG. 13 is an end view of the structure illustrated in FIG. 11.

Figure 14:
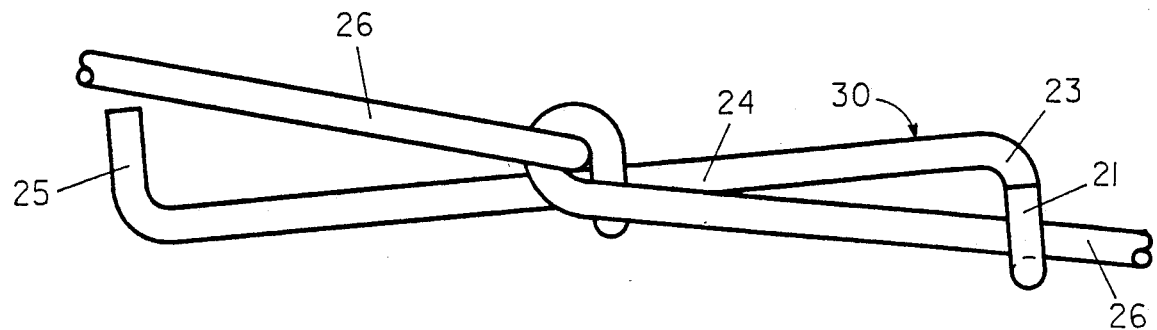

FIG. 14 is a side view of the device illustrated in FIG. 11 showing the use of the device in tightening a rope, line, cord, or the like.

Figure 15:
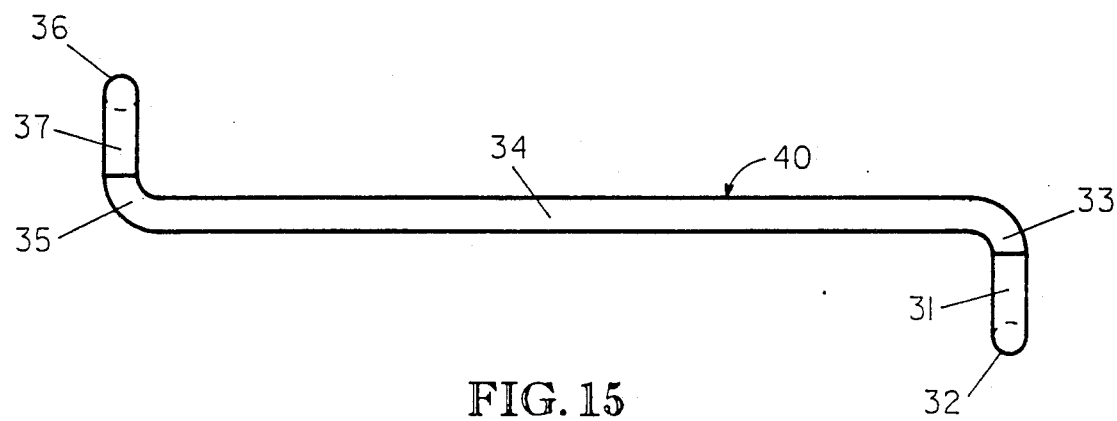

FIG. 15 is a side view of a rope tightening device which has a hook formed integrally on both ends of the device.

Figure 16:
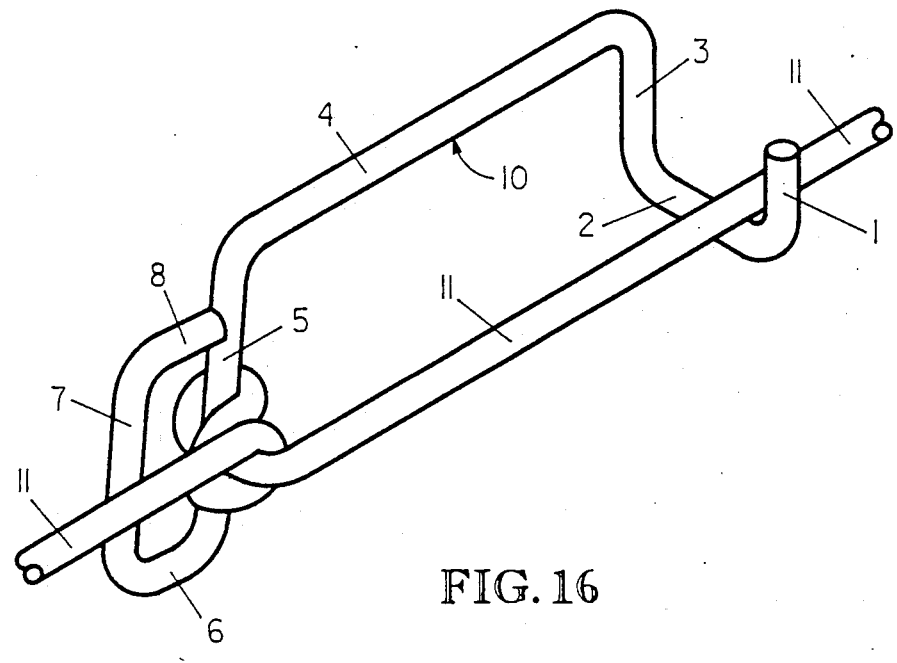

FIG. 16 is a perspective view of the rope tightening application shown in FIG. 7.

DETAILED DESCRIPTION

The rope tightening device 10 shown in FIG. 1 has a central body portion 4, right end portions 1, 2, and 3, and left end portions 5, 6, 7, and 8. The hook formed by portions 1, 2, and 3 is used to prevent reverse rotation when the rope, line, cord, or the like is tensioned using present invention. The rectangular shaped open loop formed by portions 5, 6, 7, and 8 is used to contain the rope, line, cord, or the like, and to force the rope, line, cord, or the like to twist around body portion 5 and then around itself, when the rope tightening device 10 is rotated in a plane parallel to the rope, line, cord, or the like. The air gap 9 formed by body portions 5 and 8 is of sufficient size to allow the rope, line, cord, or the like to be forced through the air gap 9, but small enough to keep the rope tightening device 10 from easily disengaging from the rope, line, cord, or the like, without being forced. The mechanical advantage of the rope tightening device 10 is determined by the length of central body portions 4, 5, and 7 and the diameter of the rope, line, cord, or the like. The mechanical advantage is huge because the pivot point is located on body portion 5 at the point where the twisting occurs. The length of body portion 4, 5, and 7 are on one side of pivot point and are opposed by the diameter of the rope, line, cord, or the like, which is on the other side of the pivot point. The ratio of the length of body portions 4, 5, and 7 to the diameter of the rope, line, cord, or the like is huge; therefore the mechanical advantage is huge.

In FIG. 7, the rope tightening device 10 is illustrated as being applied to a rope 11. The rope 11 has been twisted around body portion 5 and around itself, by rotating rope tightening device 10 clockwise in a plane parallel to the rope 11. The rope tightening device 10 is prevented from reverse rotation by the hook formed by body portions 1, 2, and 3 being positioned under and around a reach of the rope 11. The rope tightening device 10 shown in FIG. 7 has a closed rectangular loop formed by body portions 5, 6, 7, and 8. The rope must be threaded through the closed rectangular loop and since there is no air gap 9, the rope tightening device 10 becomes a capative part of the rope 11, when the fittings and terminations on the two ends of the rope 11 are too large to pass through the closed loop formed by body portions 5, 6, 7, and 8.

FIG. 8, FIG. 9, and FIG. 10 show another form of present invention. These three views show how a flat metal plate could be stamped, punched and bent to form essentially the same shape as the wire shape shown in FIG. 1. This shape could have advantages in strength and mass production.

FIG. 11, FIG. 12, and FIG. 13 show another form of present invention. The rope tightening device 30 shown in FIG. 12 is a steel wire shape, which has a hook on one end, that is formed by portions 21, 22, and 23, a central body portion 24, which extends outward from the hook at an angle of approximately 90 degrees, and an upward extension 25, which is at an angle of approximately 90 degrees from the central body portion 24.

In FIG. 14 the rope tightening device 30 is illustrated as being applied to a rope 26. The rope 26 has been twisted around the central body portion 24 of the device, and has begun to wrap around its own diameter. The device 30 is prevented from reverse rotation by the hook on its end, which has been placed under and around a reach of the rope 26. To obtain the position as illustrated, the rope tightening device 30 is positioned with a partial wrap of the rope 26 around central body portion 24 and then rotating the device one revolution in a plane parallel to the rope 26 while keeping the upward extension 25 and the hook on the other end of the device 30 confined to this plane. This wrap in the rope 26 lengthens the path between the two ends of the rope 26 and applies tension if both ends of the rope 26 have been secured hand tight.

FIG. 15 shows another form of present invention. The rope tightening device 40 shown in FIG. 15 is a metal wire shape, which has a central body portion 34, and with a hook on one end formed by body portions 35, 36, and 37 and with a hook on the other end formed by body portions 31, 32, and 33.

The rope tightener of this invention can be used for a wide variety of purposes and in fact in any situation where it is necessary or desirable to remove slack from a rope, line, cord, or the like. Rope tie-downs, lines and guys that have first been secured by means of knots, snaps, clamps or other means between two fixed points are typical examples of such situations. As more specific examples, the device may be used as a rope clamp for craftsmen, on trailer tie-downs for sportsmen and truckers, on rope guys of all kinds, on luggage tie-downs for car top carriers, on tie-downs of all kinds for boaters and yachtsmen, and to take the slack out of clothes lines. The device is used most frequently to tighten a rope, line, or cord that has already been drawn hand-tight. As shown in FIG. 16, it will be readily apparent that by rotating the rope tightening device 10 clockwise, and in a plane parallel to the rope, the rope will twist around itself, lengthening the path of the rope and increasing rope tension with each revolution of the device.

It will be readily apparent that the present invention is different from other rope tightening devices in its simplicity of design and in its method of applying tension by twisting the rope, line, cord, or the like around the body of the device during the first revolution of the device and then causing the rope to wrap around its own diameter for any additional revolutions of the device. Also the mechanical advantage of the present invention is greater than others for any specific lever arm length and wire diameter.

I claim:

1. A rope tightening device containing an elongated cylindrical body and a rectangular shaped closed loop which is formed integrally with one end of said elongated cylindrical body and is turned downward from said elongated cylindrical body and has the long sides of the said rectangular shaped closed loop more or less perpendicular to said elongated cylindrical body and all four sides of said rectangular shaped closed loop are in a common vertical plane with said elongated cylindrical body, and the other end of said elongated cylindrical body has an integrally formed hook which is turned downward from said elongated cylindrical body and is more or less perpendicular to said elongated cylindrical body, the three sides of said hook are in a common vertical plane which is more or less perpendicular to the common vertical plane containing said elongated cylindrical body and the four sides of said rectangular shaped closed loop, the side of said hook which joins said elongated cylindrical body is located in both of said vertical planes; a rope which has been threaded through the eye of said rectangular shaped closed loop and is secured on both ends will be forceably twisted around one of the long sides of said rectangular shaped closed loop for one wrap and then around its own body for all other wraps to draw said rope taut when said rope tightening device is rotated in a plane adjacent to and parallel with the path of said rope, said hook prevents reverse rotation of said rope tightening device when it is hooked around said rope drawn taut by rotating said rope tightening device in a plane adjacent to and parallel with the path of said rope; the said rectangular shaped closed loop may be opened slightly at the point where the loop is closed to give an access opening wherein a rope which is already secured on both ends can be slidingly engaged by said rope tightening device; said rope tightening device can be formed as described to work with any size rope, line, or cord.

2. A rope tightening device which is a one piece flat metal shape having an enlongated body, a rectangular shaped arm containing a rectangular shaped slot formed integrally with and extending downward from one end of said elongated body, and the other end of said elongated body has an integrally formed arm, which is bent to form a hook, extending downward from said elongated body in the same direction as said rectangular shaped arm and said rectangular shaped slot, the three sides of said hook are in a common vertical plane which is more or less perpendicular to the common vertical plane which contains said elongated body and the four sides enclosing said rectangular shaped slot, the side of said hook which joins said elongated body is located in both of said vertical planes; a rope which has been threaded through said rectangular shaped slot and is secured on both ends will be forceably twisted around one of the long sides of said rectangular shaped arm which encloses said rectangular shaped slot for one wrap and then around its own body for all other wraps to draw said rope taut when said rope tightening device is rotated in a plane adjacent to and parallel with the path of said rope, said hook prevents reverse rotation of said rope tightening device when it is hooked around said rope drawn taut by rotating said rope tightening device in a plane adjacent to and parallel with the path of said rope; there may be a small slot through said rectangular shaped arm to said rectangular shaped slot to give an access opening wherein a rope which is already secured on both ends can be slidingly engaged by said rope tightening device; said rope tightening device can be formed as described to work with any size rope, line, or cord.

* * * * *